Dec. 4, 1956  W. A. BOYD, JR  2,772,526
CENTERLESS GRINDING MACHINE
Filed March 3, 1955  2 Sheets-Sheet 2

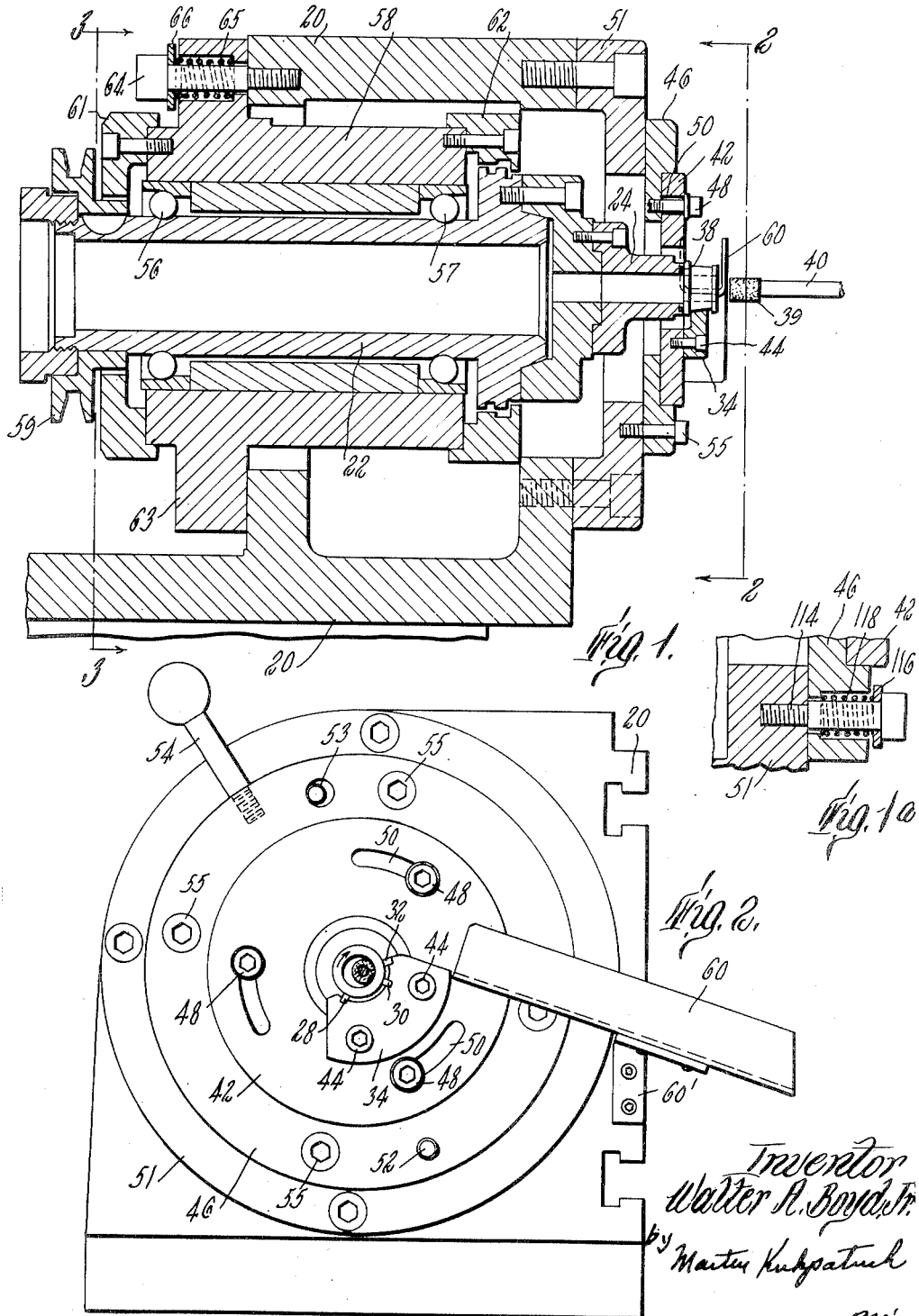

Inventor
Walter A. Boyd, Jr.
by Martin Kirkpatrick
Atty

United States Patent Office 2,772,526
Patented Dec. 4, 1956

2,772,526

CENTERLESS GRINDING MACHINE

Walter A. Boyd, Jr., Woodstock, Vt., assignor to Bryant Chucking Grinder Company, Springfield, Vt., a corporation of Vermont Application March 3, 1955, Serial No. 491,842

16 Claims. (Cl. 51—236)

The present invention relates to improvements in a centerless grinding machine of the general type having a rotary driver and means for externally supporting a cylindrical workpiece in off-set position to be rotated by said driver.

More specifically, the invention relates to a novel construction and arrangement of the machine for unloading workpieces.

It is a principal object of the invention to provide a simple and effective means for removing workpieces from the grinding position in which they are supported by the usual work engaging shoes against the eccentrically developed force of a rotary work plate.

More specifically it is an object of the invention to control the operation of the work supporting and work rotating elements of the machine in such manner that the eccentrically developed force of the driver is made effective to discharge a workpiece supported by the usual work engaging shoes from the machine.

With these and other objects in view as may hereinafter appear a feature of the invention consists in the provision of means for relatively shifting the axis position of the work engaging rotary end plate driver and of the work supporting guides of a centerless grinding machine to reverse the radial bias of the rotating end plate upon the workpiece with respect to the work guides and thereby to displace the workpiece from contact with the guides.

More specifically in accordance with the invention means are provided for shifting the position of the work engaging rotary end plate driver from a position offset from one side of center with respect to the axis of the supported workpiece to a position at the opposite side of said center in which the workpiece is caused to move in an expanding orbit away from its supported position and to be discharged from the machine, preferably onto a discharge conveyor.

With the above and other objects in view as may hereinafter appear the several features of the invention consist in the devices, combinations and arrangement of parts hereinafter described and claimed, which together with the advantages to be obtained thereby will be readily understood by one skilled in the art from the description taken in connection with the accompanying drawings in which Fig. 1 is a sectional view looking from the front of the machine of the driver and driving spindle;

Fig. 1a is an enlarged detail view of an alternative frictional holding device taking the place of the bolts 55 securing the cover plate 46 to the bracket 51;

Fig. 2 is a view taken on a line 2—2 of Fig. 1 illustrating particularly the workpiece discharge chute in operating position in the machine;

Figure 6:
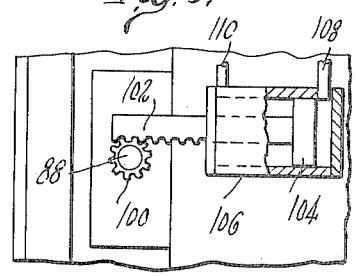
Figure 7:
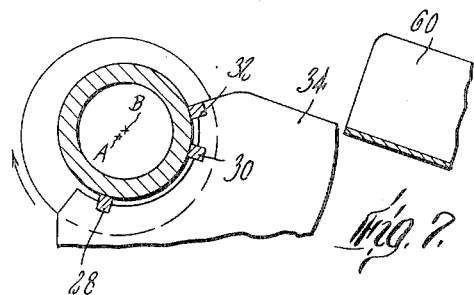
Figure 8:
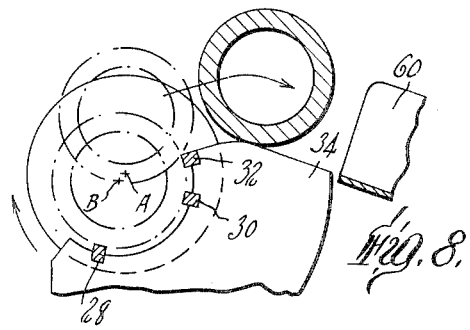

Fig. 6 is a detail sectional view showing an alternative construction of the driver positional adjustment in which movement is effected by means of a fluid motor; and Figs. 7 and 8 are somewhat diagrammatic views showing the relative positions of the driver and work supports and discharge chute of which Fig. 7 shows the parts in the normal driving position, and in which Fig. 8 illustrates the alternative adjustment of the discharge position of the driver in which the workpiece is moved away from the operating position into the discharge chute.

The invention is herein disclosed in a preferred form as embodied in a centerless grinding machine which may be of ordinary description adapted for internal grinding of cylindrical workpieces. It will be understood that only so much of the machine is shown as believed necessary to illustrate the connection of the present invention therewith.

Referring more specifically to the drawings, the elements of a centerless grinding machine as shown including a housing 20 in which is mounted a hollow rotating spindle 22, and a work driving end plate 24 mounted from the spindle. The end plate is arranged to cooperate with work supporting means comprising three work engaging shoes 28, 30, and 32 carried on a bracket 34 for external engagement with the work which is thus supported to turn on an axis offset from the rotational axis of the end plate. The workpiece may be held axially against the work plate by any well known means which in the present preferred form of the invention comprises a magnetic chucking device 38 built into the end plate 24, above referred to. An internal grinding wheel 39 mounted on a grinding wheel spindle 40, which may be of ordinary construction, is shown in a relatively withdrawn position in Figs. 1 and 2 of the drawings.

The work supporting assembly of the machine comprises the bracket 34, referred to, which is supported for minor adjustment on a circular swivel plate 42 by means of machine clamping screws 44 which extend through oversize holes in the bracket 34 into the swivel plate 42 to permit minor radial adjustments of the work engaging shoes. The swivel plate 42 is in turn mounted for rotational adjustment on a rocker plate 46 by means of machine clamping screws 48 which extend through conventional arcuate slots 50 in the circular plate 42 into the rocker plate 46. The rocker plate 46 is aligned against a bracket 51 which forms a cover for one end of the housing 20, and is pivoted on a dowel 52. The fulcrum at 52 allows for a rocking movement of the plate 46 limited by a dowel 53 solidly secured to the bracket 51 and protruding through a hole in plate 46, said hole being somewhat larger than the dowel. Said rocking movement of the plate 46 can be effected by means of a handle 54 either manually or by automatic means as desired. The rocker plate 46 is retained in its adjusted position by means of shoulder bolts 55 which pass through oversize holes in the plate and are threaded into the bracket 51.

In the shown embodiment of the invention the shoes which may be of tungsten carbide or similar material are arranged for internal grinding with two shoes 30, 32 arranged close together straddling the line of normal force the grinding wheel and a third shoe 28 in a remote position from the shoes 30 and 32 and forming together therewith a stable radial supporting device for the workpiece, as well known in the art. It will be understood that other arrangements of the shoe locations may be employed for different purposes as, for example, for external grinding, All arrangements, however, have a common feature in the sense that the workpiece is supported radially with its rotated center offset eccentrically from the rotated center of the driver in such a way that when the workpiece is supported against the driving face in frictional relationship thereto, the component forces set up thereby form a resultant force which is directed against the radially supporting shoes.

As best shown in Fig. 1 of the drawings, the spindle 22 is supported to turn on two ball bearings 56 and 57 on a spindle support 58 which is movably supported within the housing 20. The spindle 22 is continuously driven in a clockwise direction as viewed in Fig. 2 by means of driving connections which include a belt pulley 59 keyed to the left hand end of the spindle 22. The pulley 59 is connected by means of a belt and pulley driving connection with any convenient power source such as a motor not here shown.

In carrying out the present invention means are provided for shifting the operating relationships of the work supporting and work rotating elements of the centerless grinding machine in such a manner as to cause the workpiece to be automatically removed from the operating position and to be discharged from the machine.

In the illustrated machine this result is brought about by a shift in the position of the work driving end plate 24 and spindle 22 so that the axis of rotation of the end plate is brought to a position offset from the axis of rotation of the supported workpiece at the opposite side of center from the normal driving position. The component forces which for the previous operating position added up to a resultant seating force against the radial supporting shoes now become opposite and negative. The continued rotation of the work driving end plate now causes the rotating workpiece to be moved bodily away from its operating position in an orbit initially having a radius equal to the extent of the eccentric displacement between the center of the driving end plate and the center of the work piece at the unloading position, but steadily expanding, so that the workpiece is moved against and over the uppermost shoe 32 as indicated in the dot and dash intermediate position of Fig. 8. The workpiece is thus thrown or slung completely out of the magnetic field of the driver and over the curved upper surface of the supporting bracket 34 and finally onto a discharge guideway or chute 60 which is secured by a bracket 60' to the fixed housing 20. The relative normal position of the axes of the workpiece and rotating end plate for normal grinding is shown in Fig. 7 where the center of the spindle and end plate is designated at "A" located below and forwardly of the rotational axis "B" of the workpiece. The alternative discharge position of the workpiece supporting shoes and the spindle axes is shown in Fig. 8 in which the spindle has been moved upwardly and rearwardly to place the center of rotation of the end plate at the opposite sides of the rotating center of the supported workpiece, whereby the workpiece is caused to move as above set forth away from its operating position and onto the chute 60.

Figure 3:
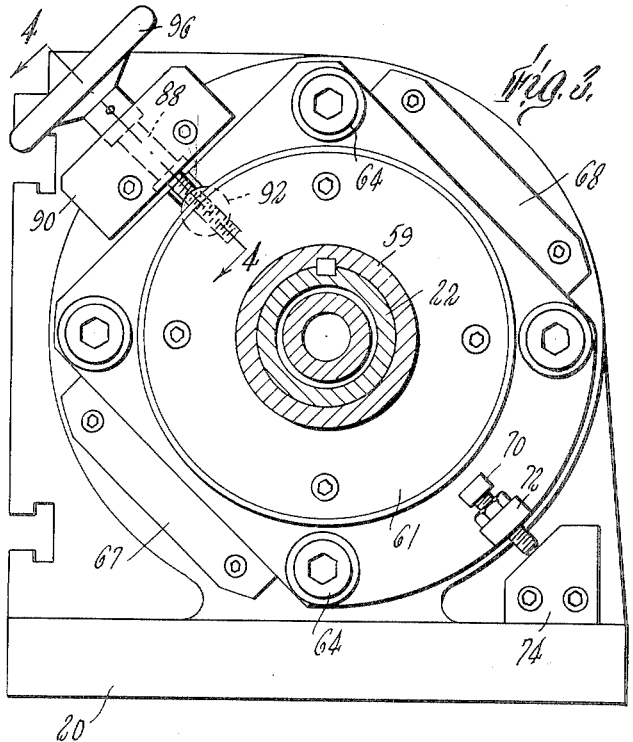
Fig. 3 is a sectional view taken on a line 3—3 of Fig. 1 illustrating particularly the adjustment of the work driver driving spindle and work driver carried thereby between operating work discharge positions.
Figure 4:
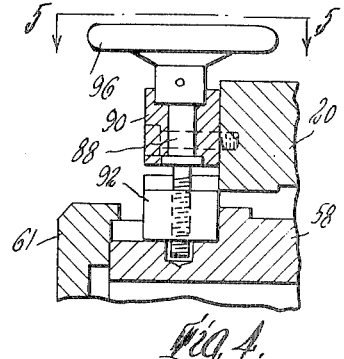
Fig. 4 is a detail sectional view of the work driver adjusting member taken on line 4—4 of Fig. 3.
Figure 5:
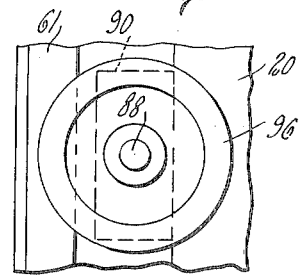
Fig. 5 is a view looking downwardly on the work driver adjusting member shown in Fig. 4.

In the illustrated form of the invention the spindle support 58 comprises a frame member which is journaled to receive the bearings 56, 57 and the spindle 22. Two end plates 61 and 62 secured to opposite sides of the frame serve to enclose the bearings. The frame member or spindle support 58 is provided at its left hand end with a flange portion 63 which overlies the end face of housing 20, being frictionally engaged therewith by means of four clamping bolts 64 which extend through oversized holes in the flange 63 and are screw threaded into the end faces of housing 20. Springs 65 coiled about the bolts 64 between reduced shoulder portions of the apertures formed in the flange 63 and at their other ends engaging washers 66 held by the bolts 64 serve to support the flange 63 yieldably against the end face of the housing 20 while allowing a limited transverse adjustment thereof. One of the bolts 64 and associated spring and washer elements is shown in detail in Fig. 1 of the drawings. The spindle support 58 is arranged to be longitudinally shiftable in a downwardly and forwardly inclined direction on a guideway formed by two guide members 67 and 68 secured to the end face of housing 20 for engagement against opposed parallel edge surfaces of the flange 63 of the spindle support 58. The spindle support 58 is normally located in the relatively depressed position as shown in Fig. 3 in which an adjustable stop screw 70 carried on a lug 72 on the flange 63 is engaged against a stop member 74 located on the relatively stationary housing 20.

The mechanism, by means of which the driver spindle 22 and end plate 24 are moved to the discharge position referred to, comprises a screw threaded adjusting member 88 which is supported to turn freely but not to move endwise in a block 90 carried on a fixed portion of a housing 20, and is provided at its lower end with a threaded portion threaded into a nut 92 attached to the slidable spindle support 58. At its upper end the adjusting member 88 is provided with a manually operable wheel 96 which when rotated in one direction will draw the nut 92 and the spindle support 58 and spindle 22 upwardly and rearwardly causing the adjustable stop screw 70 to be moved away from the contact member 74.

It is contemplated, for example, that a thread having a pitch of 16 threads per inch and giving a desired shift of .020 inch for ⅓ of a turn of the wheel will be used. The normal offset of the spindle axis is in the order of .010 inch below and forwardly of the center of rotation of the workpiece. In order to discharge the workpiece from the machine the driver spindle is moved so that its axis of rotation is in the order of .010 inch below and forwardly of the center of rotation of the workpiece.

The magnetic chucking or holding device 38 built into the end plate 24 performs an essential function in the unloading operation above described in that it serves to maintain a control over the workpiece by the frictional engagement therewith as the workpiece is moved in the expanding orbit above described, outwardly and upwardly and then over the top of the uppermost shoe 32, whence it moves of its own momentum onto the chute 60, having at this point passed out of the operating field of the electro-magnetic holding device.

It will be understood that while in the preferred embodiment shown a manually operable device is employed to relatively position the elements of the grinding machine in the work discharge position, this effect may alternatively be produced automatically with any convenient means such as the fluid actuated cylinder illustrated in Fig. 6 in which the upper end of the screw threaded adjusting member 88 is shown as formed with a pinion 100 which meshes with a rack 102 secured to the piston 104 of a fluid actuated cylinder 106. A hydraulic medium is introduced alternatively into one or the other of two supply ports 108 and 110 at opposite ends of the cylinder 106 to shift the spindle support between the operating position of Fig. 7 and the raised work discharge position of Fig. 8.

In the form of the invention above described it is assumed that the rocker plate 46 is held by the bolts 55 in a position of fixed adjustment and that relative displacement of the end plate and work axis to effect the discharge of the work from the machine is effected by a bodily shifting movement of the spindle 22 and end plate 24. In an alternative form of the invention discharge of the workpiece may be effected by a lateral displacement of the work supporting assembly including the shoes 28, 30 and 32, while the driving end plate remains in the same axial position. The modification necessary to adapt the device for operation in this alternative manner is shown particularly in Fig. 1a in which friction clamping bolts 114 are provided in the place of clamping bolts 55 shown in Figs.

1 and 2, so that ring 46 may be frictionally shiftably supported instead of positively supported in relation to the supporting bracket 51. Each friction bolt 114 is screw threaded into the bracket 51, projects outwardly through an oversized aperture in the rocker plate 46, and at its upper end is provided with a flange 116 spaced slightly above the level of the rocker plate 46. A compression spring 118 coiled about the stem of the bolt 114 bears at one end against the flange 116 and at its other end against a shoulder portion of the recess formed in the rocker plate, so that the rocker plate 46 is held frictionally in position against the end plate 51. With this construction movement of the rocker plate in either direction about its pivot 52 is limited by engagement of the pin 53 in the oversized aperture through which it extends in the rocker plate 46. In this alternative form of the device it is assumed that the spindle 22 and end plate 24 will be held in a fixed position against axial displacement. In order to discharge a workpiece from the machine the operator moves the handle 54 to the left or counter-clockwise from the position shown in Fig. 2, thus reversing the positions of the end plate and work axes as shown in Figs. 7 and 8 so that the workpiece is moved away from its supporting shoes 28, 30 and 32 and onto the discharge platform 60.

It will be understood that the invention is not limited to the specific embodiments shown and that various deviations may be made therefrom without departing from the spirit and scope of the appended claims.

The nature and scope of the invention having been indicated and a machine embodying the several features of the present invention having been specifically described, what is claimed is:

1. In a centerless grinding machine, the combination of a machine housing, a work rotating device mounted from the housing including a rotary work engaging end plate supported to turn on an axis on the housing, means holding the workpiece against the plate for maintaining a frictional driving engagement between the end plate and workpiece, work supporting means comprising radial work supporting shoes against which the work is held to rotate on an axis offset from the axis of the end plate, the work rotational axis determined by said shoes, and the axis of said rotary end plate being disposed to bias the workpiece against the work supporting shoes, and means for relatively shifting the axis position of the end plate and of said shoes to reverse the radial bias of the rotating end plate upon the workpiece with respect to the shoes, and thereby to displace the workpiece from contact with said shoes.

2. In a centerless grinding machine, the combination of a machine housing, a work rotating device mounted from the housing including a rotary work engaging end plate supported to turn on an axis on the housing, means holding the workpiece against the plate for maintaining frictional driving engagement between the end plate and workpiece, radial work supporting shoes against which the work is held to rotate on an axis offset from the axis of the end plate, the work rotational axis determined by said shoes and the axis of said rotary end plate being disposed to bias the workpiece against the work supporting shoes, means for relatively shifting the axis position of the spindle and of said shoes to reverse the radial bias of the rotating plate upon the workpiece with respect to the work supporting shoes, and thereby to displace the workpiece from contact with said shoes, and means to engage and remove said displaced workpieces from the machine.

3. In a centerless grinding machine, the combination of a machine housing, a work rotating device mounted from the housing including a rotary work engaging end plate supported to turn on an axis on the housing, means holding the workpiece against the plate for maintaining frictional driving engagement between the end plate and workpiece, radial work supporting shoes against which the work is held to rotate on an axis offset from the axis of the end plate, the work rotational axis determined by said shoes and the axis of said rotary end plate being disposed to bias the workpiece against the work supporting shoes, means for relatively shifting the axis position of the spindle and of said shoes to reverse the radial bias of the rotating plate upon the workpiece with respect to the work supporting shoes, and thereby to displace the workpiece from contact with said shoes, and a downwardly guideway having a workpiece receiving end thereof located above said shoes to receive and to remove any workpiece displaced from contact with said shoes.

4. In a centerless grinding machine, the combination of a machine housing, a work rotating device mounted from the housing including a rotary work engaging end plate supported to turn on an axis on the housing, means holding the workpiece against the plate for maintaining frictional driving engagement between the end plate and workpiece, radial work supporting shoes against which the work is held to rotate on an axis offset from the axis of the end plate, the work rotational axis determined by said shoes and the axis of said rotary end plate being disposed to bias the workpiece against the work supporting shoes, and means for shifting the axis position of the end plate to the opposite side of center with respect to the shoe supported work rotational axis and thereby to displace the workpiece from contact with said shoes.

5. In a centerless grinding machine, the combination of a machine housing, a work rotating device mounted from the housing including a spindle rotatable on its longitudinal axis and a rotary work engaging end plate secured to turn as a unit with the spindle, means holding the workpiece yieldably against the plate for maintaining a frictional driving engagement between the end plate and the workpiece, work supporting means comprising radial shoes against which the work is held to rotate on an axis offset from the axis of the end plate, the work rotational axis of said rotary end plate being offset from the axis of the work supported by said shoes to bias the workpiece yieldably against the shoes, supporting means for said spindle shiftable on the machine frame to transfer the axis position of the end plate to a position with relation to the axis of the guided workpiece in which the workpiece is biased away from contact with said shoes, and a guideway having a workpiece receiving end thereof located adjacent to and above said shoes to receive and remove the displaced workpiece from the machine.

6. In a centerless grinding machine, the combination of a machine housing, a work rotating device mounted from the housing including a spindle rotatable on its longitudinal axis and a rotary work engaging end plate secured to turn as a unit with the spindle, means holding the workpiece axially against the plate for maintaining a frictional driving engagement between the end plate and the workpiece, work supporting means comprising radial shoes against which the work is held to rotate on an axis, a spindle support on which the work engaging end plate and driving spindle for same are mounted, guide means on which said spindle support is shiftable between a driving position in which the spindle and plate axis are at one side of center with relation to the axis of the workpiece disposed to bias the workpiece against the shoes, and an alternative work discharge position at the opposite side of center with relation to the axis of the workpiece in which the workpiece is biased away from contact with said shoes.

7. A claim according to claim 6 in which a manual control member is arranged for shifting said spindle support between said alternative positions.

8. A claim according to claim 6 in which a power operated device is provided for shifting said spindle support between said alternative positions.

9. In a centerless grinding machine, the combination of a machine housing, a work rotating device mounted from the housing including a spindle rotatable on its longitudinal axis, and a radial work engaging end plate secured to turn as a unit with the spindle, a spindle support shiftably mounted on the housing, a magnetic chucking device disposed on said end plate for holding the workpiece yieldably against the plate to maintain a frictional driving engagement between the end plate and the workpiece, work supporting means comprising radial shoes against which the work is held to rotate on an axis, guide means on which said spindle support is shiftable between a driving position in which the spindle and plate axis is at one side of center with relation to the axis of the workpiece disposed to bias the workpiece yieldably against the shoes, to an alternative position at the opposite side of center with relation to the axis of the workpiece in which the workpiece is biased away from contact with said shoes.

10. In a centerless grinding machine, the combination of a machine housing, a work rotating device mounted from the housing including a spindle rotatable on its longitudinal axis, and a radial work engaging end plate secured to turn as a unit with the spindle, a spindle support shiftably mounted on the housing, a magnetic chucking device carried by said end plate for engaging the workpiece yieldably against the plate, spring means providing a frictional resistance to the movement of the spindle support and a shifting device acting when rendered operative to shift the spindle support between a driving position in which the spindle and plate axis are at one side of center with relation to the axis of the guided workpiece disposed to bias the workpiece against the work supporting shoes, and an alternative discharge position at the opposite side of center with relation to the axis of the guided workpiece in which the workpiece is biased away from contact with said shoes.

11. A claim according to claim 10 in which the housing is formed with an aperture to receive the spindle and the spindle support, and is further formed at one end thereof with an end face, and the spindle support is formed with a flange for engagement with said end plate, spring means frictionally engaging the flange against the end face, guides on the end face controlling the direction of movement of the flange and spindle support, and positioning means including a positioning screw carried on the housing and having a threaded engagement with the spindle support for shifting the spindle support and spindle between the driving work guiding engaging position of the workpiece and the alternative work discharge position.

12. In a centerless grinding machine, the combination of a machine housing, a work rotating device mounted from the housing including a spindle rotatable on its longitudinal axis, and a work engaging end plate secured to turn as a unit with the spindle, a magnetic chucking device disposed on said end plate for holding the workpiece yieldably against the plate to maintain a frictional driving engagement between the end plate and the workpiece, work supporting means comprising radial shoes against which the work is held to rotate on an axis, and a support on which the shoes are mounted shiftable between a driving position in which the spindle and plate axis is at one side of center with relation to the axis of the guided workpiece disposed to bias the workpiece yieldably against the shoes to an alternative position at the opposite side of center with relation to the axis of the guided workpiece in which the workpiece is biased away from contact with said shoes.

13. A centerless grinding machine according to claim 12 in which there is provided means under the control of the operator for shifting said radial shoe support from one to the other of said positions, and a guideway having a workpiece receiving end thereof located adjacent to and above said shoes to remove the displaced workpiece from the machine.

14. A centerless grinding machine according to claim 12 in which the shoe support comprises a rocker plate pivoted for rocking movement with the radial shoes between said operating and discharge positions, means for limiting the rocking movement of said rocker plate in each of said positions, spring friction means frictionally resisting the movement of said rocker plate, and means under the control of the operator for shifting the rocker plate from one to the other position.

15. The method of removing the workpiece from a centerless grinding machine having a machine housing, radial work supporting shoes supported from the housing against which the work is held, an end plate for rotating the work and means holding the workpiece yieldably against the plate for maintaining a frictional driving engagement between the plate and workpiece, which comprises the step of relatively shifting the rotating axis position of the end plate and of the workpiece supported against said shoes from a relatively offset position in which the work is biased against said shoes, to an alternative relatively offset work discharge position in which the plate rotational axis and said work axis are relatively offset to bias the workpiece from contact with said shoes.

16. The method of removing the workpiece from a centerless grinding machine having a machine housing, radial work supporting shoes supported from the housing against which the work is held, an end plate for rotating the work and means holding the workpiece yieldably against the plate for maintaining a frictional driving engagement between the plate and workpiece, which comprises the step of shifting the rotating axis position of the end plate from an offset position with relation to the rotational axis of the workpiece while supported against said shoes in which the work is biased against said shoes, to an alternative work discharge position in which the plate rotational axis is offset from said shoe supported rotational work axis to bias the workpiece from contact with said shoes.

References Cited in the file of this patent

UNITED STATES PATENTS

| 2,635,395 | Arms et al. | Apr. 21, 1953 |
| 2,696,986 | Grobey | Dec. 14, 1954 |
| 2,706,369 | Dix | Apr. 19, 1955 |